(12) United States Patent
Vincent et al.

(10) Patent No.: US 6,547,567 B1
(45) Date of Patent: Apr. 15, 2003

(54) BOUNCING BALL APPARATUS

(75) Inventors: Thomas Lange Vincent, Tucson, AZ (US); Bradley Evan Paden, Santa Barbara, CA (US); Randolph James Crowson, II, Santa Barbara, CA (US); Tom Dragnes, Santa Barbara, CA (US); David Brian Paden, Goleta, CA (US)

(73) Assignee: The University of Arizona, Tucson, AZ (US)

( * ) Notice: Subject to any disclaimer, the term of this patent is extended or adjusted under 35 U.S.C. 154(b) by 153 days.

(21) Appl. No.: 09/615,818

(22) Filed: Jul. 13, 2000

(51) Int. Cl.⁷ .............................................. G09B 23/08
(52) U.S. Cl. ....................................... 434/302; 434/300
(58) Field of Search ................................. 434/300, 301, 434/302, 276; 446/168, 429, 486, 489

(56) References Cited

U.S. PATENT DOCUMENTS

| | | | | |
|---|---|---|---|---|
| 872,325 A | * | 12/1907 | Boyd | 29/235 |
| 3,141,340 A | * | 7/1964 | Boehm | 73/382 R |
| 3,354,559 A | * | 11/1967 | Beck | 434/302 |
| 3,594,925 A | * | 7/1971 | Abbat | 434/302 |
| 3,629,957 A | * | 12/1971 | Somashekar | 434/302 |
| 3,797,131 A | * | 3/1974 | Orfei | 434/302 |
| 3,882,736 A | * | 5/1975 | Jayne | 73/514.15 |
| 3,921,014 A | * | 11/1975 | Jayne | 310/314 |
| 3,950,890 A | * | 4/1976 | Kittell | 446/415 |
| 4,028,818 A | * | 6/1977 | Warner | 434/302 |
| 5,046,984 A | * | 9/1991 | Cane | 446/168 |
| 5,201,876 A | * | 4/1993 | Stengel | |
| 5,393,064 A | * | 2/1995 | Beard | 473/154 |
| 6,015,296 A | * | 1/2000 | Fenkanyn | 434/301 |
| 6,075,466 A | * | 6/2000 | Cohen | 340/933 |

* cited by examiner

Primary Examiner—Derris H. Banks
Assistant Examiner—Kurt Fernstrom
(74) Attorney, Agent, or Firm—Dennis R. Haszko

(57) ABSTRACT

An apparatus has a ball that bounces vertically on a vibrating piston. The system demonstrates the complex dynamics impact systems for education and research in dynamical systems theory and feedback control.

15 Claims, 2 Drawing Sheets

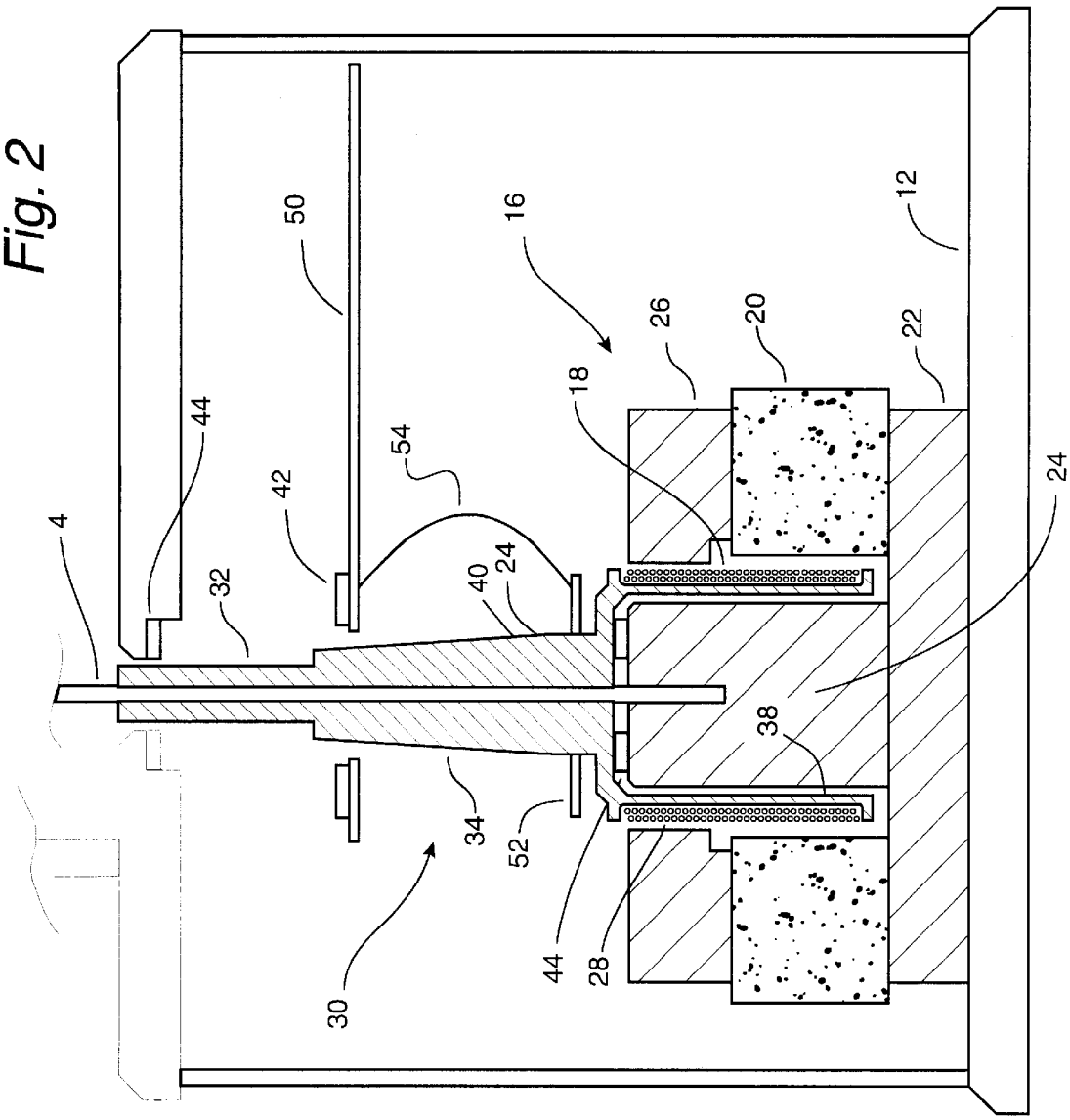

US 6,547,567 B1

BOUNCING BALL APPARATUS

BACKGROUND OF THE INVENTION

1. Field of the Invention

The invention relates to system exhibiting complex dynamic and chaotic motion for use as laboratory experiments, demonstrations, and education. The invention also relates to linear motors and their application in such systems.

2. Description of the Prior Art

Dynamical systems theory has become an important analytical method for understanding random vibrations, fluid motion, ecology, and many other systems modeled by ordinary differential equations. A number of systems have become key examples in education and research and are discussed in popular textbooks (see for example Guckenheimer and Holmes, 1993). One such example is the bouncing ball on a vibrating table. A wonderful aspect of the bouncing ball system is that the equations of motion are simple, but the motion itself exhibits amazing complexity such as chaos (see Vincent, 1997). Classroom discussions consider an idealized system where the ball remains fixed in the horizontal direction bouncing perfectly up and down. In practice, however, small imperfections in the table and the ball cause the ball to drift off the table. No practical demonstration system for bouncing ball dynamics has been reduced to practice in the prior art.

Several prior art devices address related problems, put to not meet the objectives of the current invention.

In U.S. Pat. No. 3,882,736 issued to Jayne, an apparatus is disclosed for maintaining a bouncing ball between concave plates. The motion of the ball in this system is not the same as the motion of a ball on a vibrating table however.

In U.S. Pat. No. 5,028,053 issued to Leopold, a ball having twenty-two hemispherical projections is disclosed. The invention does exhibit complex bouncing behavior, but the bouncing does not have the motion of a bouncing ball on a vibrating table.

It is clear from the discussion above that there is no device capable of demonstrating the dynamics of a ball bouncing on a vibrating table. Accordingly, it is desirable to provide for a new bouncing ball apparatus, which is simple, reliable, and produces ball motions consistent with mathematical models of a bouncing ball on a vibrating table. Further what is needed is a device that constrains the ball motion to a simple vertical up and down motion and that can produce rapid vibrations of an impacting surface below the ball.

SUMMARY OF THE INVENTION

It is the principle object of this invention to provide a system for demonstrating nonlinear dynamics and chaotic motion. More specifically, the objects of this invention are: to demonstrate the dynamics of a bouncing ball on a vibrating piston and to provide the user with accurate measurements of the piston height and the time that the ball contacts the piston. Further objects of this invention are to minimize cost, and create motions that which largely follow the simple equations of motion as described in Guckenheimer and Holmes, 1993.

The present invention is directed at a linear motor driven bouncing ball system. By nature of its novel component configuration manufacturing costs are minimized, and the alignment of the piston with the ball is excellent. Further the time that the ball impacts the piston is measured accurately and inexpensively with a novel sensor choice and placement. Likewise the piston height is measured with a novel sensor choice and placement.

The mechanism allowing for the relative motion of the ball and piston is novel, low-cost, and precise in the sense that friction on the ball is minimized, and the motion of the piston is sensed so that its motion can be precisely controlled by feedback.

BRIEF DESCRIPTION OF THE DRAWINGS

FIG. 2 is an enlarged section view of the base section of the bouncing ball apparatus.

DETAILED DESCRIPTION OF THE PREFERRED EMBODIMENTS

Figure 1:
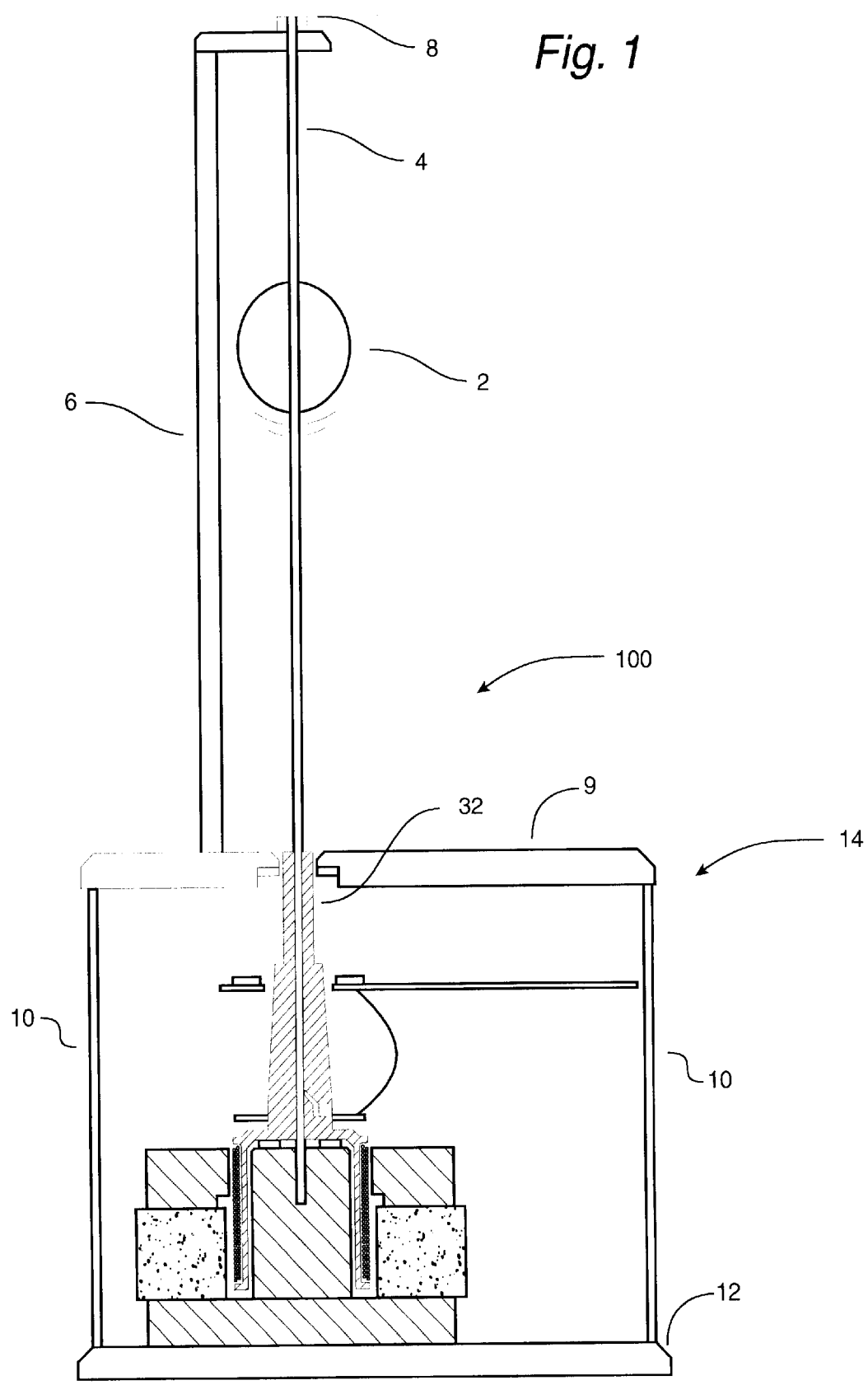
FIG. 1 is a section view of the bouncing ball apparatus.

The present invention is drawn to a linear motor driven bouncing ball apparatus. Although the preferred design and use is discussed in detail herein, it should be noted that the present invention might be utilized in a variety of similar manners. Such various settings include, without limitation, an education laboratory device, a novelty item, an entertainment device, or a device for producing chaotic signals. For purposes of illustration, discussion of the present invention will be made in reference to its utility as an educational dynamics experiment. Descriptions of the wiring for power and control of this device has been omitted for the sake of clarity.

Referring now to FIG. 1, there is shown a preferred embodiment of the bouncing ball apparatus 100. The apparatus 100 is intended to be used in an educational laboratory such as a university physics or engineering laboratory. The apparatus 100 includes a drilled ball 2 constrained to move on vertical rod 4. Other means including an arm and pivot, flexures, and guide rods, can be used to constrain the ball motion so long as the motion is largely vertical. The ball is made from elastic material with a high coefficient of restitution. Alternatively, a rigid ball and a spring between the ball and piston 32 can replace the elastic ball so long as any impact between the ball and the piston is elastic. Said vertical rod is supported by a vertical support 6 and held in tension with nut 8. Alternatively, the vertical rod can be self-supporting. The friction between the drilled ball 2 and vertical rod 4 is minimized with teflon bushings, lubricants, or other means known to those skilled in the art of tribology. The vertical support is supported in turn with top plate 9, which is supported by the side supports 10 that are supported by bottom plate 12.

The components 9, 10, and 12 together with those that they enclose are referred to as the base 14 of the apparatus. Internal to said base and depicted in FIG. 2 is a linear voice coil actuator 16 comprising a voice coil 18, axially magnetized ring magnet 20, bottom pole 22, center pole 24, and top pole 26. Said ring magnet is made from ferrite, NdFeB, or other permanent magnet material. The poles 22, 24, and 26 are made from mild steel or other soft ferromagnetic material. Components 4, 12, 20, 22, 24, and 26 are bonded together with adhesive or otherwise fastened mechanically.

The magnetic function of said actuator 16 is summarized as follows: The combination of magnet and pole pieces in actuator 16 is well known to those skilled in the art of loudspeaker design and linear motor design. The magnet and pole pieces collectively produce a radial magnetic field in the gap 28 between the top pole 26 and center pole 24. A controlled electrical current in coil 18 then produces a force along the vertical axis due the physical relationship $F=iL\times B$, where B is a magnetic field, L is the length of conductor in that field, i is the current in the conductor and F is the force produced.

Actuator 16 acts on the piston assembly 30 to produce vertical oscillatory motions in the piston assembly. The piston assembly comprises a cylindrical section 32 called the piston, the taper 34, the bobbin 38, the microphone 24, and the acoustic waveguide 40. The bobbin supports the voice coil 18 and is made from aluminum, plastic, or other nonferrous material. Electromagnetic forces on the voice coil are transmitted to the piston assembly through the bobbin. Bobbin 38 is attached to the taper 34, which is preferably made from aluminum or other conductive material. As the taper moves vertically through flat coil 42, the inductance of the flat coil changes due to the conductivity of the taper 34 and is used as a measure the vertical position of the piston assembly. The taper is attached to the piston that impacts the ball causing it to bounce. Flat coil 42 is etched on the printed circuit board 50. The printed circuit board is mounted to the top pole 26 with standoffs not shown. A ring shaped printed circuit board 52 is mounted at the base of said taper and serves as a common point of electrical interconnection and wire strain relief. The magnet wire comprising coil 18 is terminated on printed circuit board 52, the wires to the microphone 24 are terminated on said printed circuit board, and a flexible cable 54 conducting signals to the coil 18 and from the microphone 24 is mounted to 52. The other end of flexible cable 54 is connected to electronics on printed circuit board 50. The detailed connections on 52 are not shown.

The microphone is in acoustic communication with the impact surface between the drilled ball 2 and piston 32. The acoustic communication is accomplished via the acoustic waveguide 40 and the gap (not shown) between the piston assembly 30 and the vertical rod 4. When the ball impacts the piston an acoustic wave is transmitted to the microphone and the time and magnitude of impact can be measured. Other sensing means can be incorporated to measure the relative position of the piston and the ball. For example, but not limited too, accelerometers, acoustic range sensors, optical range sensors, capacitive sensors, optical cameras, and position encoders can be incorporated for the measurement. Continuous measurement of the ball location is also possible by using commercially available sensors.

The piston assembly 30 is constrained to move vertically by the vertical rod 4, and has limited motion in the vertical direction due to bumpers 44 located in the top plate 8 and on the center pole 24. Other means exist for constraining the piston assembly to vertical or near-vertical motion. Ball bearing rollers can be used in conjunction with linear tracks, bushings on vertical rods different from 4 can be used, parallelogram rods or flexures can be used to obtain near vertical motion, or a suspension pivot arm can be used so long as the motion of the piston assembly is largely constrained to vertical or near-vertical motion. The bumpers 44 cushion impacts and are made from elastomeric materials preferably with high damping coefficients. A lubricant and/or bushings between the piston assembly and the vertical rod minimizes friction.

The bouncing ball apparatus is commonly used in conjunction with a feedback controller of the proportional-derivative (PD) or proportional-integral-derivative (PID) type for positioning the piston assembly. The feedback controller typically uses the piston position sensor together with a sinusoidal reference trajectory to produce periodic motion of the piston assembly. Such a controller for tracking control is well-known to those skilled in the art (see e.g. Franklin et al).

What is claimed is:

1. A bouncing ball apparatus comprising:
   a ball;
   a means for limiting movement of said ball to vertical, bi-directional movement;
   a piston assembly for vertical, bi-directional movement, said piston assembly disposed beneath said ball; and
   a means for actuating vertical, bi-directional movement of said piston assembly;
   wherein actuation of said piston assembly by said means for actuating moves said ball vertically.

2. The apparatus as claimed in claim 1 wherein
   said means for limiting movement includes a vertical rod having a vertical axis,
   said ball includes a hole sized to allow bi-directional movement of said ball about said vertical rod along said vertical axis.

3. The apparatus as claimed in claim 2 wherein said piston assembly is limited to bi-directional movement about said vertical rod along said vertical axis.

4. The apparatus as claimed in claim 3 further including an impact sensor means for measurement of duration and intensity of impact of said ball against said piston assembly.

5. The apparatus as claimed in claim 4 wherein said impact sensor means is a microphone.

6. The apparatus as claimed in claim 1 wherein said means for actuating is a linear voice-coil motor.

7. A bouncing ball apparatus comprising:
   a rod member having a first end and a second end, said rod member being oriented along a vertical axis;
   a ball connected to said rod member between said first end and said second end of said rod member;
   a piston assembly coupled to said first end; and
   an actuator coupled to said piston assembly;
   wherein said actuator causes said piston assembly to move said ball bi-directionally along said vertical axis between said first end and said second end.

8. The apparatus as claimed in claim 7 further including a support member where said rod member is mounted to said support member in a manner parallel to said vertical axis such that said support member limits movement of said ball along said vertical axis.

9. The apparatus as claimed in claim 7 further including a bumper for limiting said piston assembly to bi-directional movement along said vertical axis.

10. The apparatus as claimed in claim 7 where said actuator is a linear voice-coil motor.

11. The apparatus as claimed in claim 7 further including a sensor for measuring duration and intensity of impact of said ball against said piston assembly.

12. The apparatus as claimed in claim 11 wherein said sensor is a microphone.

13. The apparatus as claimed in claim 7 where said ball is formed from elastic material.

14. The apparatus as claimed in claim 7 further including a spring connected between said piston assembly and said ball.

15. The apparatus as claimed in claim 14 where said ball is formed from rigid material.

* * * * *